R. F. TIMMONS.
SAFETY LOCK FOR WIRE WHEELS.
APPLICATION FILED SEPT. 3, 1919.
1,357,010.
Patented Oct. 26, 1920.
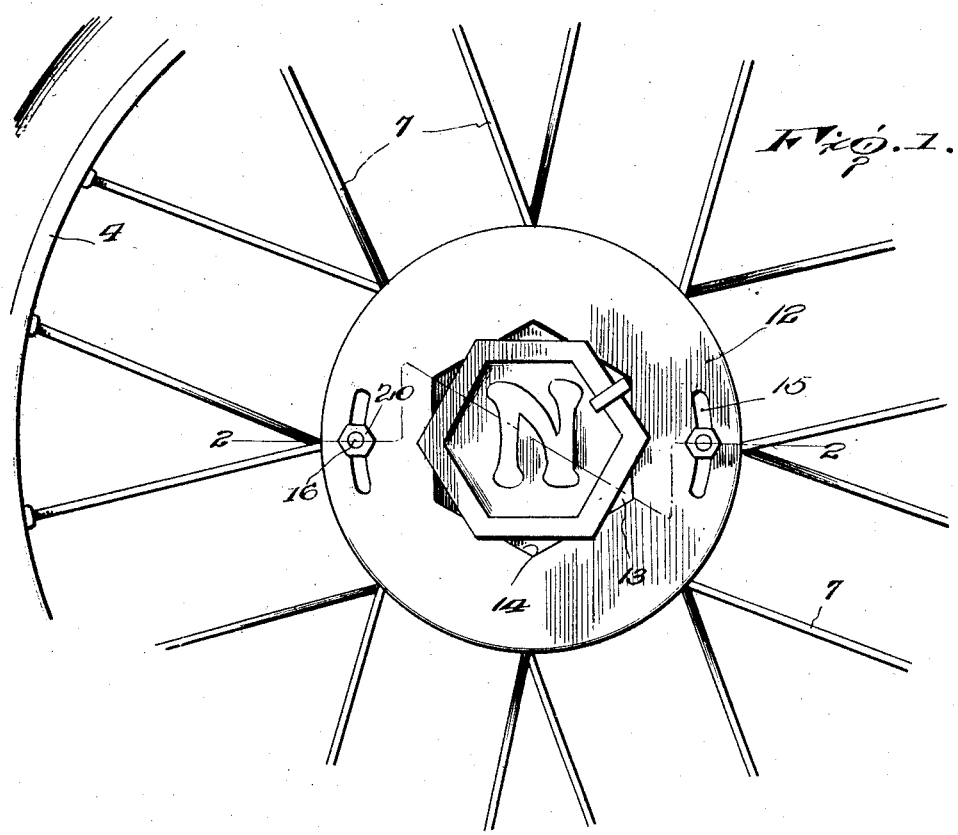
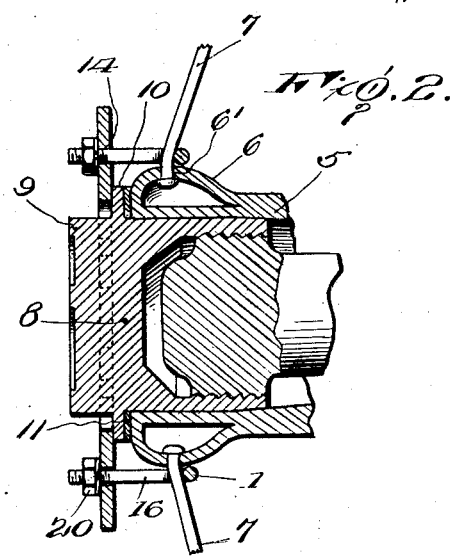
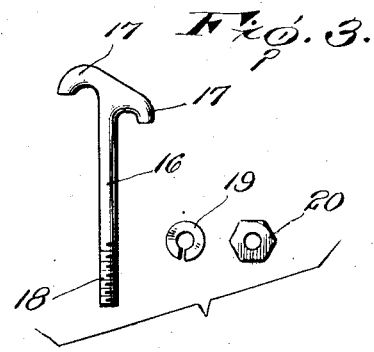
Inventor
R. F. Timmons.
by Lacey & Lacey,
his Attys.

UNITED STATES PATENT OFFICE.

ROBERT F. TIMMONS, OF COSHOCTON, OHIO.

SAFETY-LOCK FOR WIRE WHEELS.

1,357,010.  Specification of Letters Patent.  Patented Oct. 26, 1920.

Application filed September 3, 1919. Serial No. 321,343.

*To all whom it may concern:*

Be it known that I, ROBERT F. TIMMONS, a citizen of the United States, residing at Coshocton, in the county of Coshocton and State of Ohio, have invented certain new and useful Improvements in Safety-Locks for Wire Wheels, of which the following is a specification.

This invention relates to improvements in locking devices for the hub caps of wire wheels.

An important object of this invention is to provide a lock for the hub caps of wire wheels which may be readily and conveniently applied without altering the construction of the hub cap or the hub to which it is applied.

A further object of the invention is to provide a lock of the class described which is simple, efficient, and cheap to manufacture.

Other objects and advantages will be apparent during the course of the following description.

In the accompanying drawing forming a part of this application, and in which like numerals are employed to designate like parts throughout the same, Figure 1 is a front elevation of my improved lock applied, Fig. 2 is a transverse section taken on line 2—2 of Fig. 1, and Fig. 3 is an elevation of an attaching member embodied in the invention.

In the drawing wherein for the purpose of illustration is shown a preferred embodiment of the invention, the numeral 4 generally designates a wire wheel provided with a hub 5. An annular flange 6 surrounds the hub 5 and is provided with a plurality of radial openings 6' receiving the inner end portions of spokes 7. As illustrated in Fig. 1 the inner end portions of the several pairs of spokes converge and one spoke of each pair is arranged slightly in advance of the other. A hub cap 8 is adapted for attachment to the hub and is provided with a hexagonal head 9 adapted to be engaged by a wrench for attaching and removing the hub cap. The hub cap 8 is provided with an annular flange 10 surrounding the outer side of the hub and serving to limit the inward movement of the hub cap. As illustrated in Fig. 2, an annular gasket 11 surrounds the hub cap and is confined between the annular flange 11 and the front side of the hub.

The improved locking device includes an annular locking plate 12 adapted to be arranged about the hexagonal head and in abutment with the annular flange 10. The annular locking plate 12 is provided with a centrally arranged opening 13, the side wall of which is provided with V-shaped recesses or notches 14. The recesses or notches 14 receive the corner portions of the polygonal head and thereby prevent accidental rotation of the hub cap. A pair of arcuate slots 15 are provided in the annular plate 13 on opposite sides of the axis of the same and are adapted to receive locking bolts 16. As illustrated in Fig. 3, the locking bolts 16 are provided with hooked heads 17 adapted to engage the spokes 7 for anchoring the device. One hooked head of each locking bolt is arranged slightly in advance of the other for engaging the spokes with a uniform degree of pressure. The forward end portions of the bolts 16 are screw threaded as indicated at 18 and are adapted to be extended through the arcuate slots 15. Lock washers 19 and nuts 20 are adapted to be arranged on the forward portions of the bolts 16 for securing the bolts and the locking device in position. The arcuate slots 15 permit of the insertion of the bolts 16 regardless of the position of the slots with relation to the spokes. The presence of the arcuate slots 15 renders the attachment of the locking plate extremely convenient since it is not necessary to arrange the openings in the plate directly outwardly from certain pairs of the spokes.

When it is desired to apply the device to a hub cap, the annular locking plate 12 is arranged about the hexagonal head 9 and the V-shaped notches 14 receive the corners of the head 9. The bolts 16 are now passed from the rear sides of the spokes through the elongated slots 15 and are secured to the plates by the nuts 20. The locking plate 12 prevents accidental rotation or loosening of the hub cap and absolutely prevents loss of the same. When it is desired to remove the hub cap, the locking plate 12 may be released by removing the bolts 16 and may readily be withdrawn from engagement with the hexagonal head 9 and the flange 10.

It is to be understood that the form of the invention herewith shown and described is to be taken as a preferred embodiment of the same and that such minor changes may be made as will remain within the spirit of the invention and the scope of what is claimed.

Having thus described the invention, what is claimed as new is:

1. A locking device for the hub caps of wheels comprising a plate having means for non-rotatably engaging the hub cap, and locking devices connected to said plate and having hooked laterally projecting oppositely disposed heads adapted for engaging the spokes of the wheel.

2. A locking device for the hub caps of wheels including a plate having an opening non-rotatably receiving the hub cap, locking bolts extended through said plate and provided with hooked heads adapted to engage the spokes of the wheel, and nuts engaging the forward ends of said locking bolts.

3. A locking device for the hub caps of wheels including an annular plate non-rotatably receiving the hub cap, said plate being provided with a plurality of openings, and locking bolts extended through said openings and provided with pairs of hooked heads adapted to engage the spokes of the wheel for rigidly securing said plate in position, one hooked head of each pair being disposed in advance of the other head of that pair.

4. A locking device for the hub caps of wheels including an annular plate having an opening adapted to receive the head of a hub cap, said locking plate being provided with a plurality of arcuate slots, and locking devices engaged with the spokes of the wheel and extending through said arcuate slots for rigidly securing said annular plate in position.

In testimony whereof I affix my signature.

ROBERT F. TIMMONS. [L. S.]